(12) United States Patent
Smith et al.

(10) Patent No.: US 6,862,298 B1
(45) Date of Patent: Mar. 1, 2005

(54) ADAPTIVE JITTER BUFFER FOR INTERNET TELEPHONY

(75) Inventors: Shawn W. Smith, Ventura, CA (US); Mark R. Cromack, Santa Ynez, CA (US)

(73) Assignee: Crystalvoice Communications, Inc., Santa Barbara, CA (US)

( * ) Notice: Subject to any disclaimer, the term of this patent is extended or adjusted under 35 U.S.C. 154(b) by 780 days.

(21) Appl. No.: 09/627,956

(22) Filed: Jul. 28, 2000

(51) Int. Cl.[7] .................................................. H04J 3/06
(52) U.S. Cl. .................. 370/516; 370/235; 370/252; 370/253; 370/517; 370/519; 370/508; 370/429
(58) Field of Search ................................ 370/412, 235, 370/236, 252, 253, 428, 429

(56) References Cited

U.S. PATENT DOCUMENTS

| | | | |
|---|---|---|---|
| 4,630,261 A | 12/1986 | Irvin | 370/81 |
| 5,142,583 A | 8/1992 | Galand et al. | 381/38 |
| 5,333,299 A | 7/1994 | Koval et al. | 395/550 |
| 5,526,353 A | 6/1996 | Henley et al. | 370/60.1 |
| 5,708,756 A | 1/1998 | Wang et al. | 395/2.29 |
| 5,737,531 A | 4/1998 | Ehley | 395/200.38 |
| 5,883,891 A | 3/1999 | Williams et al. | 370/356 |
| 5,899,966 A | 5/1999 | Matsumoto et al. | 704/205 |
| 5,907,822 A | 5/1999 | Prieto, Jr. | 704/202 |
| 5,933,803 A | 8/1999 | Ojala | 704/223 |
| 5,996,018 A | 11/1999 | Duault et al. | 709/234 |
| 6,012,026 A | 1/2000 | Taori et al. | 704/229 |
| 6,212,206 B1 * | 4/2001 | Ketcham | 370/516 |
| 6,259,677 B1 * | 7/2001 | Jain | 370/252 |
| 6,301,258 B1 * | 10/2001 | Katseff et al. | 370/412 |
| 6,360,271 B1 * | 3/2002 | Schuster et al. | 709/231 |
| 6,366,959 B1 * | 4/2002 | Sidhu et al. | 709/231 |
| 6,377,931 B1 * | 4/2002 | Shlomot | 704/503 |
| 6,389,032 B1 * | 5/2002 | Cohen | 370/412 |
| 6,452,950 B1 * | 9/2002 | Ohlsson et al. | 370/516 |
| 6,580,694 B1 * | 6/2003 | Baker | 370/252 |

* cited by examiner

Primary Examiner—Ricky Ngo
Assistant Examiner—Kevin Mew
(74) Attorney, Agent, or Firm—Koppel, Jacobs, Patrick & Heybl

(57) ABSTRACT

In an improved system for receiving digital voice signals from a data network, a jitter buffer manager monitors packet arrival times, determines a time varying transit delay variation parameter and adaptively controls jitter buffer size in response to the variation parameter. A speed control module responds to a control signal from the jitter buffer manager by modifying the rate of data consumption from the jitter buffer, to compensate for changes in buffer size, preferably in a manner which maintains audio output with acceptable, natural human speech characteristics. Preferably, the manager also calculates average packet delay and controls the speed control module to adaptively align the jitter buffer's center with the average packet delay time.

15 Claims, 8 Drawing Sheets

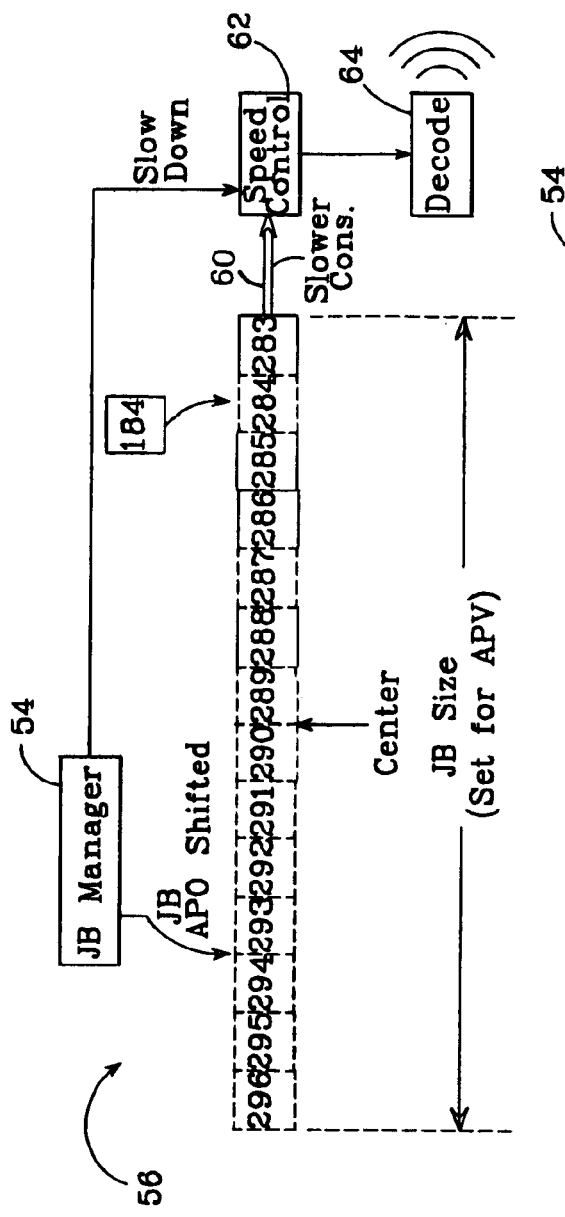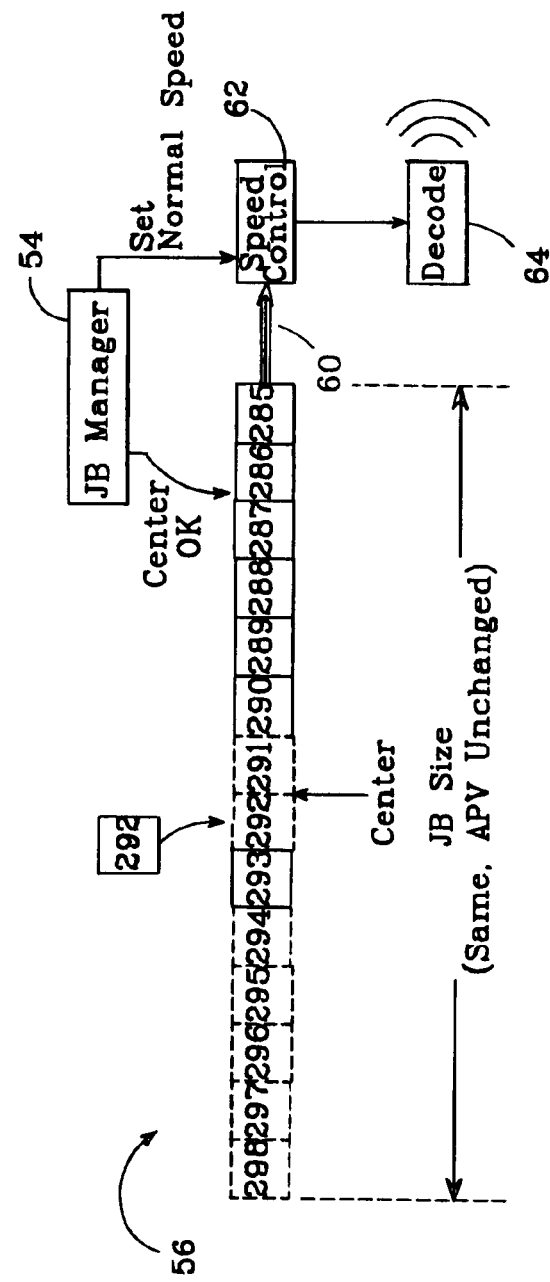

ADAPTIVE JITTER BUFFER FOR INTERNET TELEPHONY

BACKGROUND OF THE INVENTION

1. Field of the Invention

This invention relates to digital voice communications in general and more specifically to conveying voice information digitally over a non-ideal packet network, such as providing long distance telephone service over the Internet using Voice-over-Internet-Protocol (VOIP).

2. Description of the Related Art

A typical VOIP system is shown in FIG. 1. Person A's voice is digitized, compressed, and divided into small packets of encoded binary data by Gateway B (numbered in temporal sequence in the figure, for convenience). The packets are sent over the unregulated network C which results in them arriving at the far end Gateway D with varying amounts of delay on each packet. Gateway D puts the packets back in the correct order (1,2,3,4), then uncompresses (or, synonymously, decodes) the encoded binary data and thus provides a continuous audio signal to person E which sounds like a slightly delayed copy of what person A said. The same process typically happens in the reverse direction at the same time, thus supplying a full duplex conversation.

In general, there are at least three factors which determine the perceived quality of the resulting phone conversation: (1) distortions introduced by the compression/decompression (coder losses); (2) total delay from speech event to aural reception. (3) drop outs and other artifacts due to packets arriving too early or too late to be correctly included into the audio stream (or outright packet loss).

Appropriate audio compression/decompression methods are available so that issue (1) does not contribute significantly to the overall perceived quality of the conversation. Examples of such coders include ITU standards G.728, G.729, G.729a, G.723.1, GSM, G.722 and many others which provide a Mean Opinion Score (MOS) of 3.6 to 3.9 as compared to the perfect toll-quality telephone connection MOS of 4.1 Simply put, if all the packets arrive quickly and no packets are lost, these coders can provide call quality which is very hard to distinguish from a normal phone call over high quality circuit switch connections (e.g. the traditional PSTN phone system).

Issues (2) and (3) are still troublesome in packet networks, even with efficient codecs. FIG. 2 shows a prior system which uses a static jitter buffer 20 to compensate for variable network delays encountered by packets. Exemplary packets 1,5,6 and 10 arrive asynchronously, and each is routed to an appropriate relative position in the jitter buffer queue 20, according to its temporal address (commonly tagged as part of the packet). The jitter buffer 20 is then shifted, much in the manner of a shift register, to read the packets out serially to a decoder 22 in the correct sequence. Slight jitter in arrival time is thus eliminated, as the contents of the buffer 20 are clocked out by a synchronous local clock at the receiver.

A large static jitter buffer can be designed into the receiving gateway to optimize performance against large amounts of network delay jitter at the cost of large delays which will be noticed by users; on the other hand, a small jitter buffer can be used which will introduce minimal delays but at the cost of significant packet loss. In this case, call quality degrades when the network jitter exceeds the size of the jitter buffer.

Conventionally, a compromise is adopted: a fixed jitter buffer of medium size is used, which introduces noticeable but only midly annoying delays. One such system, for example, is described in U.S. Pat. No. 5,526,353 to Henley et al. (1996). That system uses a jitterbuffer of predetermined length to reassemble packets, thus introducing a fixed delay. (The amounts of data available to the buffer vary, but not the buffer length). Such a jitter buffer manages to accomodate most network delays with only periodic drops in quality when the network is unusually slow or fast. Users may notice the fixed, moderate delays on all calls (typically 50–100 ms for internet telephony, according to Henley Col. 6, line 66), and many calls will have compromised audio quality due to failure of packets to fit in the jitter buffer (early or late arrival).

SUMMARY OF THE INVENTION

In view of the above problems, the present invention significantly improves the audio quality while maintaining smaller delays during periods of high network quality, yet maintains audio quality by increasing delay during periods of network degradation. The invention automatically monitors network conditions, and adapts to changing network conditions without attracting the attention of the listener.

The invention provides a system and method for receiving digital voice signals transmitted over a data network (for example, the internet). The system includes a jitter buffer (data buffer) having a variable storage size, arranged to receive packets of data which make up a digitized, packetized audio signal. A jitter buffer manager monitors packet arrival times from the network and determines at least one time varying variation parameter which measures a variation in transit delay time among arriving packets. The jitter buffer manager also adaptively controls jitter buffer size in response to the variation parameter, which is calculated from time to time. A speed control module responds to a control signal from the jitter buffer manager by modifying the rate of serial data transfer (rate of consumption) from the jitter buffer, to compensate for changes in the jitter buffer's storage size and maintain a predetermine rate of audio output. Preferably, the speed control also either augments or discards packet data to compensate for the changes in jitter buffer size, and does so in a manner which maintains audio output with acceptable natural human speech characteristics.

In a preferred embodiment, the jitter buffer manager also calculates an average packet delay and compares this delay with a reference delay corresponding to a temporally centered position in the jitter buffer. The manager then adjusts the rate of transfer of packets from the jitterbuffer to adaptively align the jitter buffer's center position with the (time varying) average packet delay.

Preferably, the manager controls the jitter buffer size to a size which is statistically likely to accept a predetermined fraction of packets (less than but approaching unity) based upon the calculated variance parameter. The predetermined fraction is selected to produce a desired quality level in an audio signal decoded from the packets. The quality level can suitably be user selected based upon subjective audio evaluation, or pre-selected- to produce a desired Mean Opinion Score (MOS) in the decoded audio signal.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 7a is a diagram of a third exemplary case, in which the jitter buffer manager detects a change in average packet transit delay, without significant change in the variance of the packet delay; and FIG. 7b is a diagram of a time subsequent to FIG. 7a, when the jitter buffer manager has reestablished the center of the jitter buffer in equilibrium with the changed network average delay.

DETAILED DESCRIPTION OF THE INVENTION

Figure 1:
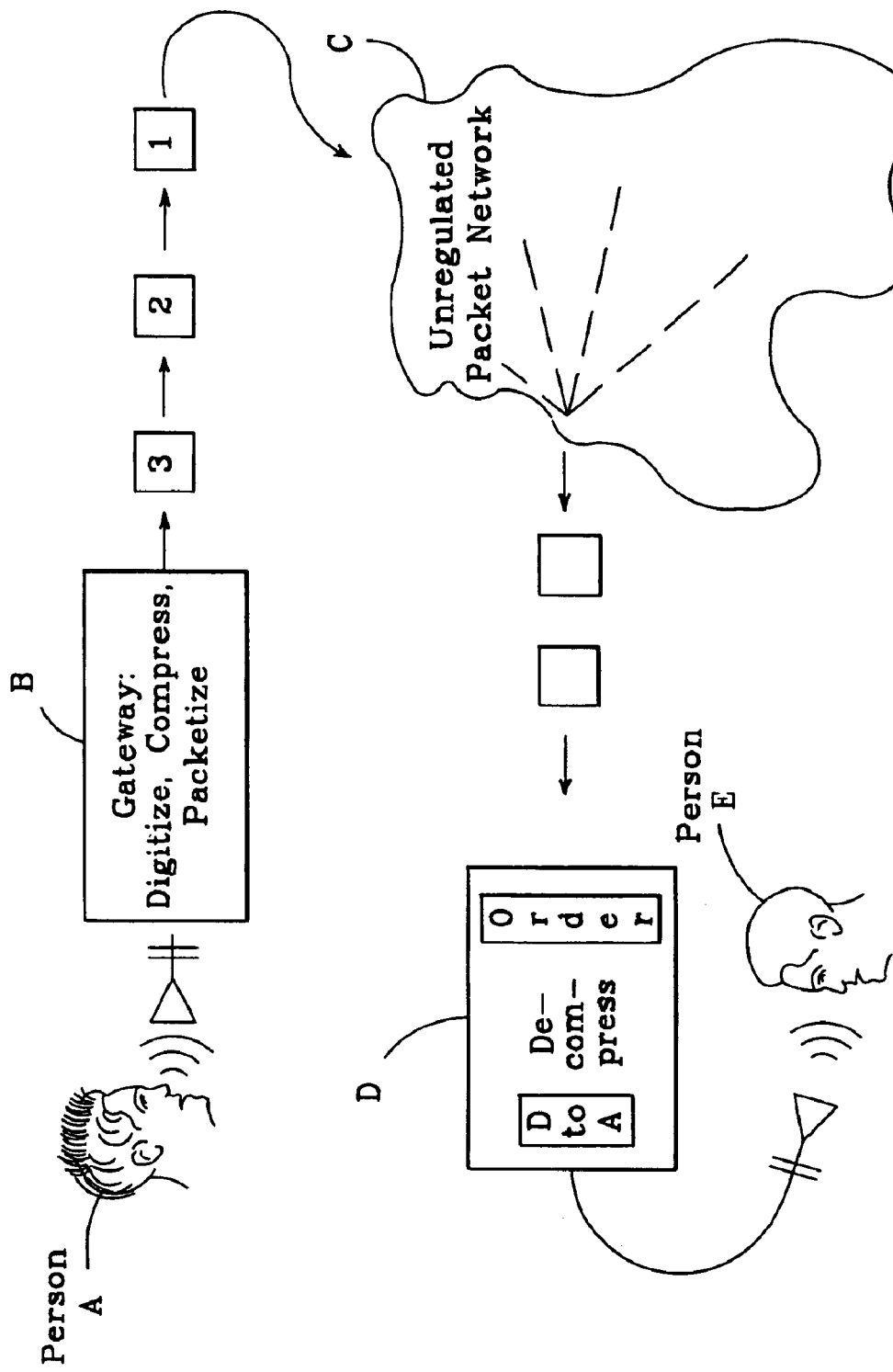
FIG. 1 is a block diagram of a typical prior Voice Over Internet Protocol (VOIP) telephony system.
Figure 2:
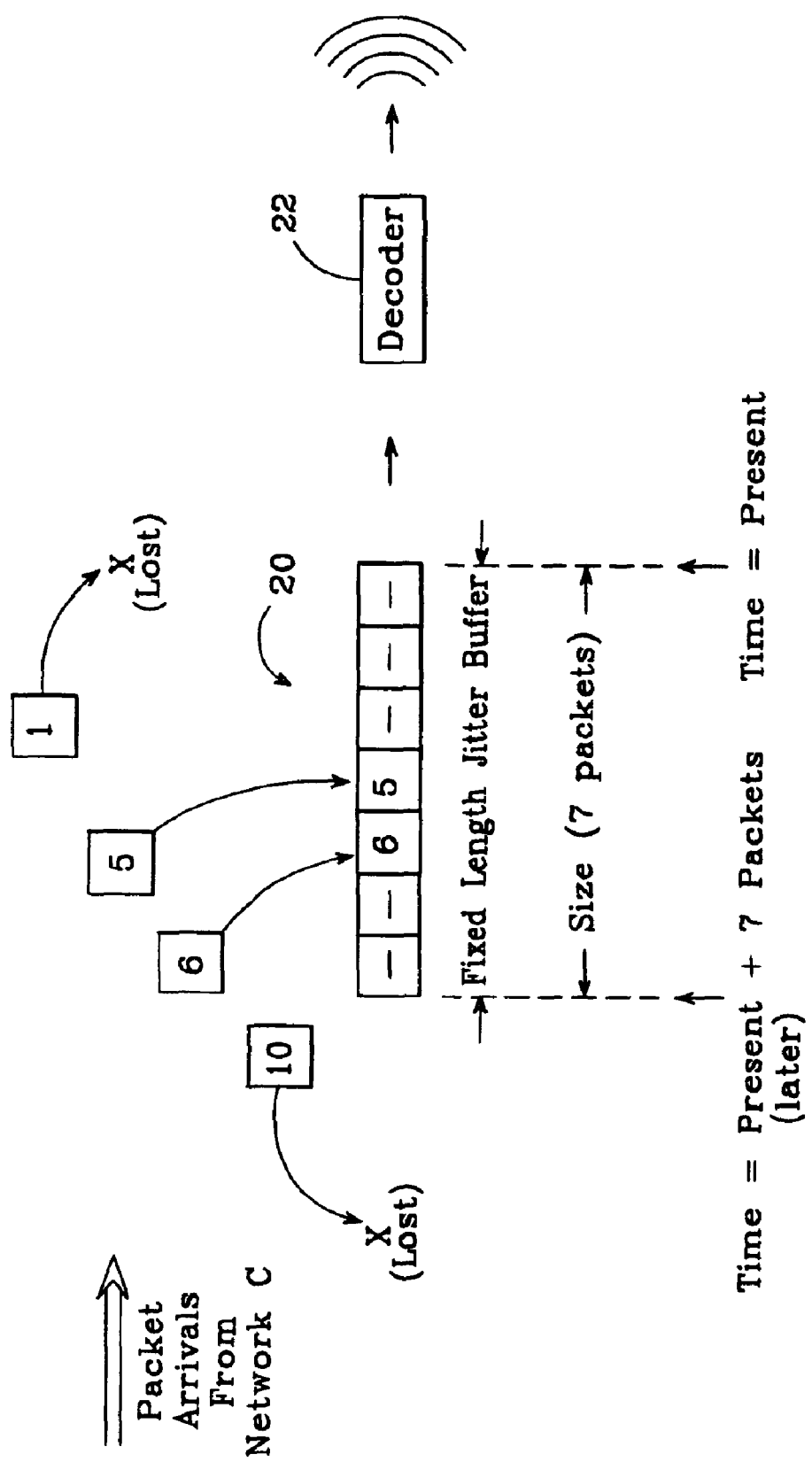
FIG. 2 is a block diagram of a prior art VOI receive system which uses a static jitter buffer to compensate for variable network delays.
Figure 3:
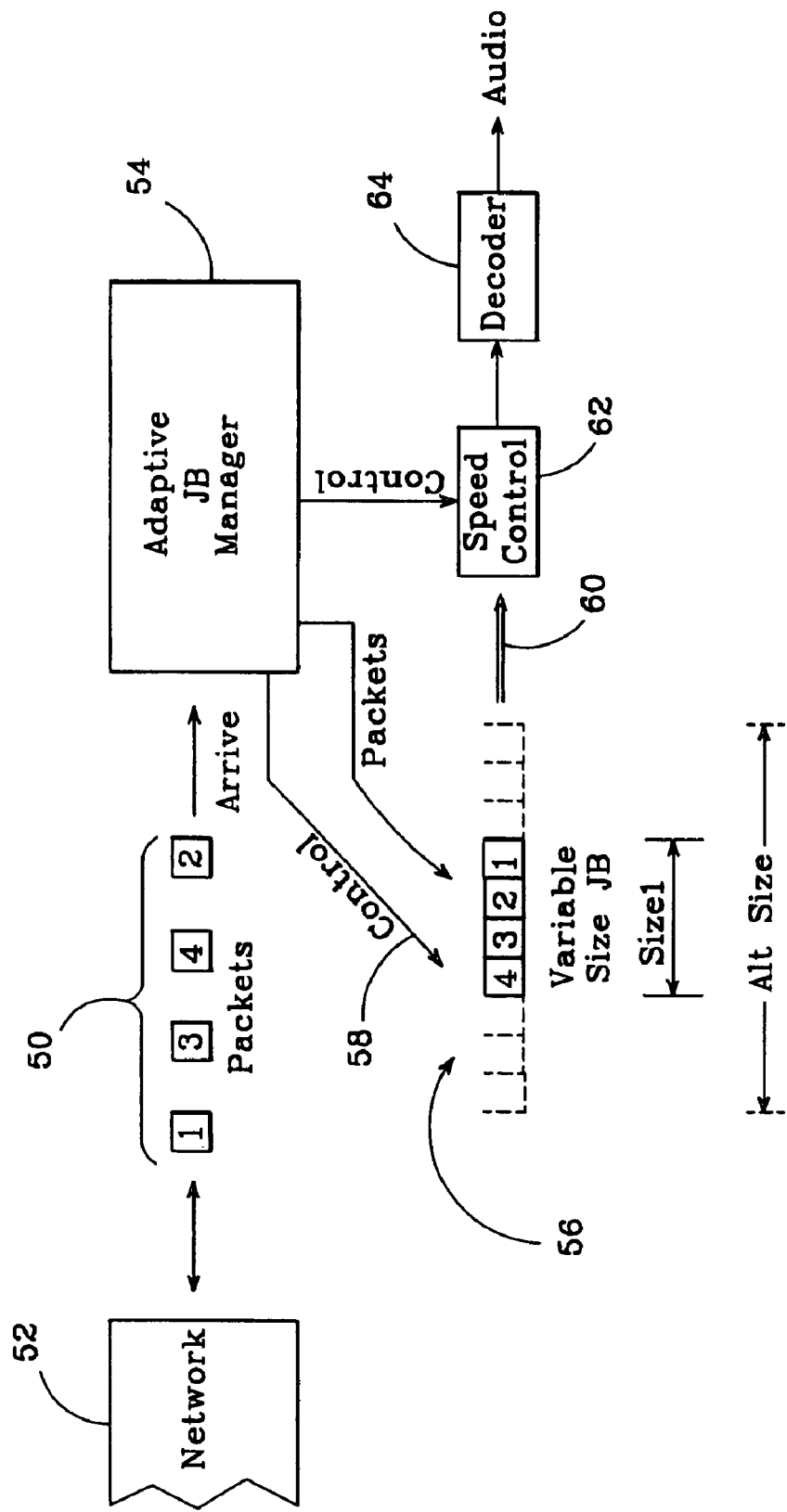
FIG. 3 is a system level block diagram of a VOIP receive system in accordance with the invention.

A system level view of the invention is shown in FIG. 3. Encoded digital Packets 50 arrive via a data network 52 sequentially, with (in general) varying packet delays. Most generally, the packets need not arrive in the proper sequence, if network protocols allow. An adaptive jitterbuffer manager 54 preferably receives the packets and loads them into a variable size jitterbuffer 56. Equivalently, in some embodiments the jitterbuffer manager merely monitor the packet reception, which are received directly by the jitterbuffer or a separate port. In full duplex communication, at least two such systems would be used, one at each end of the communication channel (data network 52). In fact, the invention can be applied in an arbitratily complex communications topology wherein each user has a distinct system, to allow multiparty conference communications.

In a typical embodiment, the adaptive Jitterbuffer manager 54 would suitably be a program executing on a general purpose microprocessor such as the Motorola 860 or Intel Pentium. Alternatively, a specialized DSP processor could be used. The variable length jitterbuffer is suitably a managed memory allocation, under control of the manager 54. Another equivalent alternative would be a dedicated memory block or register, under control of manager 54.

Variable size jitterbuffer 56 receives control input 58 from jitterbuffer manager 54, causing it to adjust its size according to network propagation conditions. The jitterbuffer manager 54 calculates the size setting, which changes adaptively in real time, according to at least one parameter based upon the arrival delays order and delay variation ("jitter") of the packets 50.

The data in jitterbuffer 56 is (continuously) shifted sequentially out, through a data channel 60 through speed control module 62, hence through decoder 64, and is ultimately reconverted to audio (speech) for a listener, by conventional electronic methods (not shown). The speed control 62 is under control of the manager 54, and performs the important function of augmenting (or filling) or contracting the speech information as directed by the manager 54.

The speed control module 62 is complementary to the variable size jitterbuffer in that it compensates for changes in the size of the jitterbuffer, as controlled by the manager 54. During operation, so long as the jitterbuffer length remains constant, it is easy to maintain constant output data rate (equal to average input data rate into the jitterbuffer). However, whenever the length of the jitterbuffer is extended or contracted, the input rate will necessarily be unequal to the output data rate for the jitterbuffer, unless data is discarded or filled. By using the speed control module in complement to the variable size jitterbuffer, the psychoacoustic effect of the size changes is reduced, producing a more acceptable perceived audio quality for the listener.

The operation in accordance with the invention of the manager 54, the jitterbuffer 56 and the speed control 62 will be described in sequence below.

Definitions

The following definitions are helpful for understanding the discussion which follows (of a particular embodiment of the invention). They are intended to facilitate explanation only, and are not intended to limit the invention. Some of the definitions apply in the context of a particular software embodiment of the JB manager of the invention; different equivalent hardware and software embodiments are possible.

JB: Jitter Buffer, a variable size storage area for digital audio data packets.

JBsize: The (time varying) size of the JB, which can be expressed as a count of packets or, more conveniently, in time units (milliseconds). For example, JBsize of 20 packets at a typical packet size of 20 ms/packet yields a 400 ms JBsize.

Speedsetting: the (time varying) speed setting of the speed control module 62. The speed control 62 preferably supports (at least) rates of "normal", "speedup" and "slowdown". Speedup causes packets to be consumed faster than normal, while slowdown causes them to be consumed more slowly than normal. The speed control module 62 maintains acceptable audio quality in all three modes.

Average packet offset: (APO) A moving average of the offset in time between (1) the temporal position assigned to an arriving packet in the JB, and (2) the "front" of the JB (packet which is currently serially being output to speed control/decoder). Assuming that the distribution of jitter is not skewed (time symmetrical), the APO should preferably be set to ½ of the JBsize. In this case, the packets arrive and are loaded, on average, at the "center" of the JB. Note that APO is not a measure of jitter.

Average packet variance: (APV) A parameter which is a measure of variation in packet delay, or "jitter." APV is most suitably a moving average of the variance of packet arrival time from the APO. For example, if packets arrive in perfect, periodic synchrony, APV will be zero. Suitably initialized to ½ the JBsize or typically 50 mSec.

CenterThreshold: a variable which determines in a particular software embodiment of the JBmanager how close to center the APO is maintained by the JB manager.

Growthreshold: a variable which is used, in a particular software embodiment of the JBmanager, a predetermined threshold. In such embodiment, when the APV exceeds Growthreshold, then the JB manager will control the JB to increase JBsize.

Shrinkthreshold: a variable which determines, in a particular software embodiment of the JBmanager, a threshold for shrinking the JB. When the APV falls below the shrinkthreshold, then the JB manager controls the JB to decrease JBsize.

Adaptive Jitter Buffer Manager

The logic contained in the Jitter Manager is designed to keep the jitter buffer sized and positioned well at all times so that packet-loss due to network jitter is reduced while keeping the buffer size reasonably small, thus keeping delays as short as possible. The preferred size of the jitter-buffer is calculated in relation to the network jitter.

The Jitter Manager preferably performs two tasks: First, it determines if any changes in the jitter buffer size and alignment are desirable; and second, to implement those changes (if any) by altering the jitter buffer and adjusting the speed control.

Figure 4A:
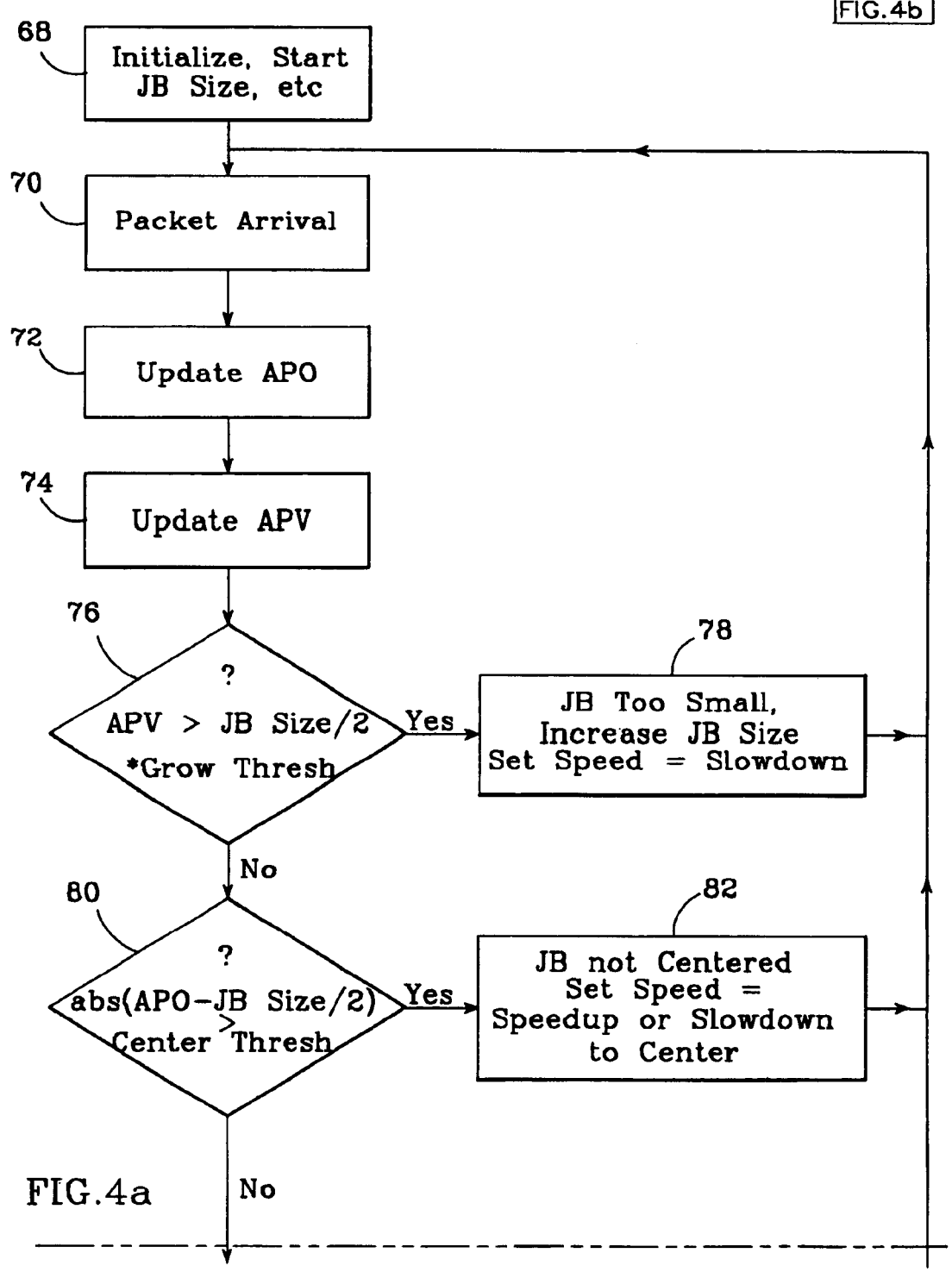
FIG. 4a is a flow diagram of a method suitable for use by the jitter buffer manager of FIG. 3, in accordance with the invention.
Figure 4B:
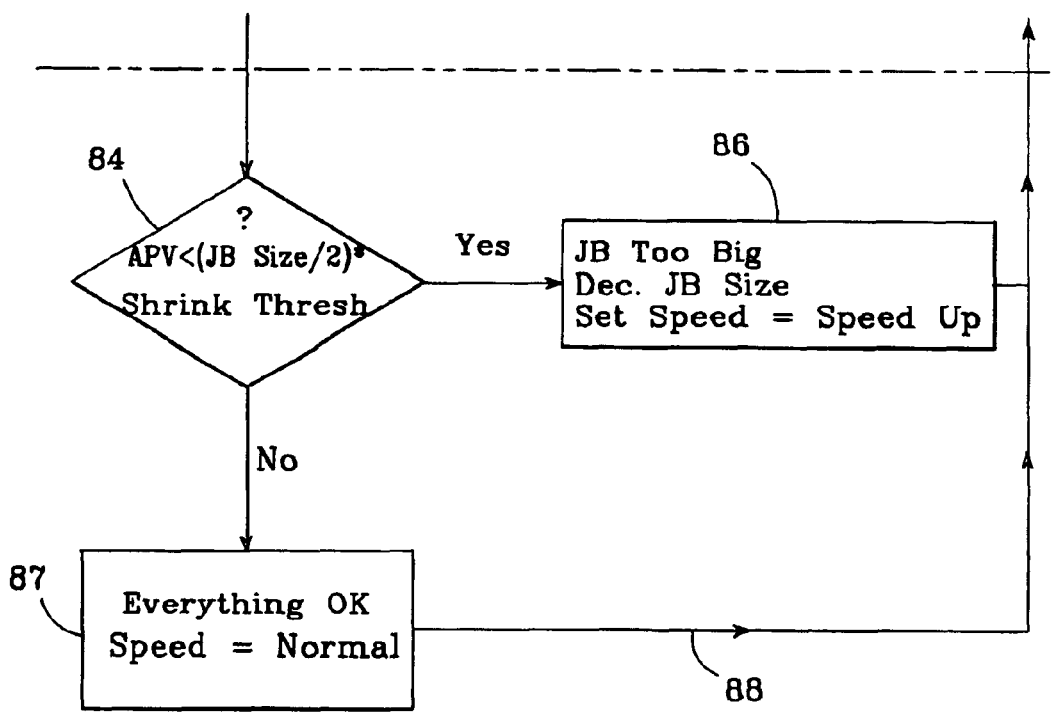
FIG. 4b is a flow diagram continuing from FIG. 4a and showing the continuation of the method.

FIGS. 4a and 4b show a method which can suitably be used by the jitter manager 54 to determine the preferred jitter buffer length and speed control settings for control output. The Jitter Manager 54 observes (step 70) each packet arrival. Typically, protocol demands that all packets be marked with a sequence number which allows them to be ordered correctly by the receiver, by loading them into correct (randomly accessed) positions in the jitter buffer. Alternatively, time stamps can be included in the packets, which are then used to sort the packets. If the packets are sent with a previously known period between packets, the sequence number can be used to measure the network jitter of each packet. In a perfect, fixed-delay network with no jitter, each packet would arrive exactly one packet-duration after the last, and would then be placed directly in the center of the jitter buffer. At the end of each receive period, the buffer shifts one packet (to the right in FIG. 3). Subtracting each arrived sequence number from the sequence number about to be sent out from the front of the jitter buffer will produce a (relative) packet delay measurement number (which is constant for a network with no jitter). Di represents the difference between (1) the time index of the packet currently being read by the decoder and (2) the packet currently arriving from the network. This offset of each packet, "Di", is used by the Jitter Manager in subsequent steps, to determine correct alignment and size of the jitter buffer.

The Jitter manager next calculates APO (step 72) as a moving average of the packet arrival offsets Di, which The average is preferably calculated according to the equation:

$$NewAPO=((OldAPO*AVELEN)+Di)/(AVELEN+1)$$

Where NewAPO is the current calculated value of APO, Old APO is the previously calculated value, and the variable AVELEN controls the number of frames that the moving average is performed over (suitably set to 100). Other types of moving averaging, smoothing, or prediction could also be used, such as Kalman filtering or other known techniques for estimation.

In a similar manner, the variance of the packet arrival offsets (APV) is calculated (step 74), preferably according to the equation:

$$Variance=abs(APO-Di)$$

$$NewAPV=((OldAPV*AVELEN)+Variance)/(AVELEN+1)$$

where NewAPV is the current calculated value of APV, and OldAPV is the previous calculated value. Thus, the individual packet variance is first calculated against the current APO, and then this variance is used to update the APV moving average in a manner similar to the APO. Again, other statistical means could be used to calculate APV. Whatever method is used, APV should provide a measure of the variation in packet arrival time, relative to a reference, average arrival time. A conventional mean square variance is suitable for use as the APV.

The calculated variance is then used to determine (step 76) the correct size for the jitter buffer. Specifically, in one embodiment APV is compared to (JBsize/2) times a predetermined Growthreshold. If APV exceeds (JBsize/2) times the Growthreshold, the size of the optimal jitter buffer is too small and consequently it is increased (step 78) to "catch" a desired proportion of the packets, based on the calculated variance. Thus, a parameter, preferably the variance in packet arrival offset, is used to determine the preferred jitter buffer size to catch a desired portion of packets. Packets with delay offset outside of the variably set buffer length will necessarily be dropped, but the JBsize is adjusted to decrease the number of dropped packets below an acceptable fraction (resulting in at least a desired signal/noise ratio).

If the Jitterbuffer size is at least adequate in step 76, the Jitter Manager next checks the APO in relation to the center of the jitterbuffer (step 80). The manager compares the average delay (APO) to the JB center (at JBsize/2), and if the absolute value of the difference exceeds a predetermined threshold (centerthresh), the manager proceeds to Step 82. In step 82 the manager adjusts speedSetting to equal either speedup or slowdown, to shift the jitter buffer center to match the new current APO. For example, if packets are arriving (consistently) late, the jitter manager reacts in step 80 by speeding up data consumption by the speed control from the jitter buffer. Conversely, if delay decreases so that the APO moves ahead of the JB center, packets are arriving too early; in this case the manager slows down data consumption to move the jitterbuffer center back, allowing enough room for jitter ahead of the JB center.

Next, in step 84 the JB manager compares the current arrival time variance APV with the jitter buffer size. Specifically, it preferably evaluates whether APV is less than (JBsize/2) times a predetermined shrink threshold value (shrinkthresh). If yes, the JB proceeds in step 86 to decrease the JB size, and also sends a speed control signal to the speed control 62 causing it to set speed to speedup. The speed control 62 then consumes packets at a faster rate, compensating for the shrinking size of the JB without introducing noticeable audio effects in the output.

Finally, if the above steps do not result in adjustment of either JB size or its center, then the packets are arriving in a steady state equilibrium with decoding (insofar as data rate and delay are concerned). In that case, speed is set to normal (step 87) and the JB manager returns to step 70 via a return path 88. The steps are then repeated reiteratively in real time, so long as data is being received, adjusting in response to any changes in network conditions.

If speed control were not employed, the only means to increase the jitter buffer size and alignment would be to simply starve the decoder for the length of time required by the new size. This would produce a variety of unpleasant acoustic affects to the end user such as drop-outs, glitches, and distortions. By using speed control, the effect of resizing the buffer is spread out over time with minimal impact on the perceived audio quality. Specific techniques of speed control are discussed below.

Figure 5A:
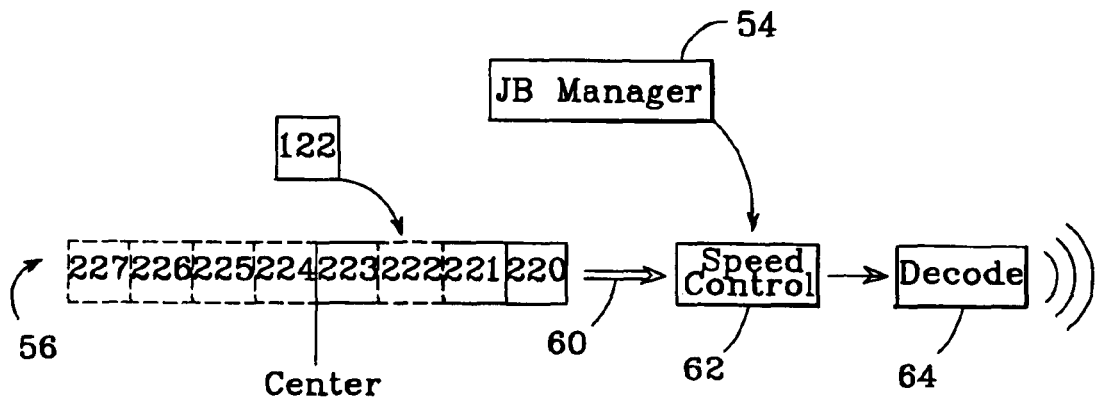
FIG. 5a is a diagram illustrating an exemplary case in which the jitterbuffer manager operates at equilibrium, with a small jitter buffer size.
Figure 5B:
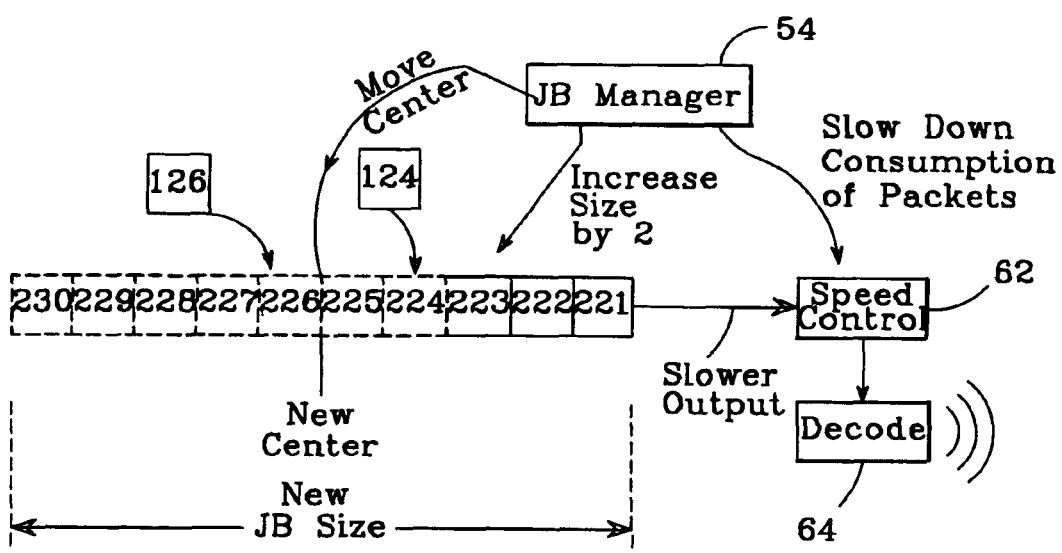
FIG. 5b is a diagram showing a time subsequent to FIG. 5a, in which network conditions have decayed, introducing increased variance transit delay for arriving packets, which causes the jitter buffer manager to compensate.
Figure 5C:
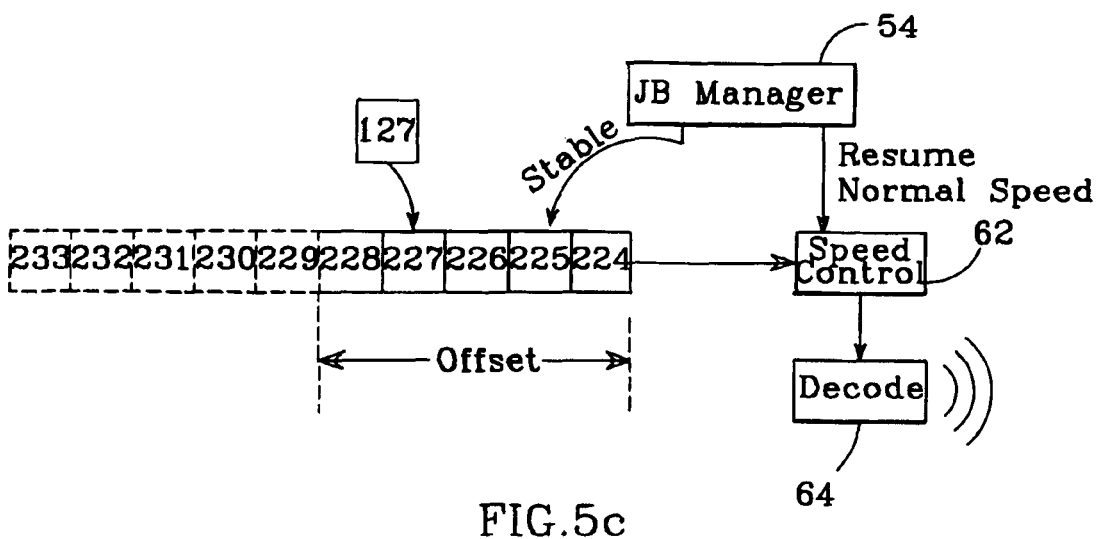
FIG. 5c is diagram showing a time subsequent to FIG. 5b, in which the manager has re-established a steady state condition in equilibrium with changed network conditions.

FIG. 5a–5c illustrate an exemplary case in which the manager increases jitterbuffer size to compensate for network degradation. FIG. 5a represents the initial situation before network degrades. Jitter buffer 56 includes, initially, eight allocated slots 220 through 227. (In this and the following figures, solidly outlined slots indicate memory which has the incoming packet loaded-filled slots-while phantom outlined slots are "empty" allocated but still awaiting receipt of corresponding packet data.) Packet 122 loads into a respective buffer slot 222, with offset of two packet periods from the shift output (serial out). Packet arrival variance is two periods. The speed control 62 and decoder 64 reads at the same rate as (average) packet arrival, yielding steady audio with a two packet period delay.

In FIG. 5b, network conditions have decayed somewhat: average delay is now 4 packets, and the variance of the offset is >2. Jitter buffer slots have shifted one period (to the right in the figure) and thus are now numbered 221–230 in recognition that one period had passed since FIG. 5a. Packet 124 is shown arriving late, whereas 126 arrives on center. Both are loaded into corresponding slots in the jitter buffer 56. To compensate for the increased variance, the jitter buffer manager 54 decides to shift the buffer load position to a different slot and increases the size of the buffer by allocating 2 more slots. The manager 54 also sends a control signal to speed control 62 and decoder 64 causing it to slow its rate of serial packet consumption. As discussed below, the speed control does this preferably in a psychoacoustically transparent manner.

Finally, in FIG. 5c again a steady state situation has been reestablished, in equilibrium with the now degraded network conditions. The reduced consumption rate has allowed the packet arrivals to catch up with the consumption of data by the speed control/decoder. A larger jitter buffer 56, with slots 224–233 and with larger offset receives data at the same rate that the data is consumed by the speed control 62. The larger buffer 56 allows more slots for early or late arriving packets (such as 127), thus accommodating the higher variance of offset.

Figure 6A:
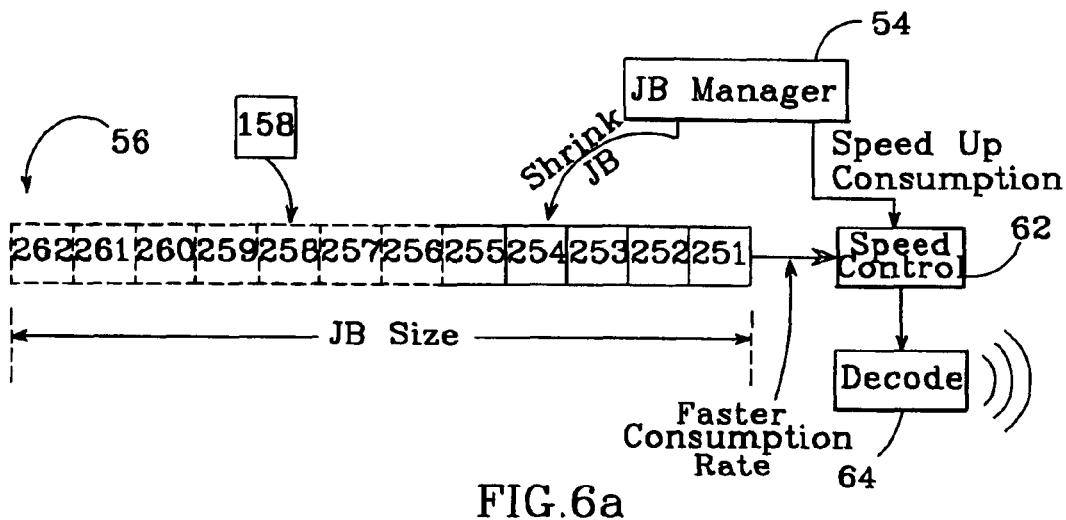
FIG. 6a is a diagram showing a second exemplary case, in which the jitterbuffer manager detects a decrease in the variance transit delay of arriving data packets, and compensates by shrinking the jitter buffer size.
Figure 6B:
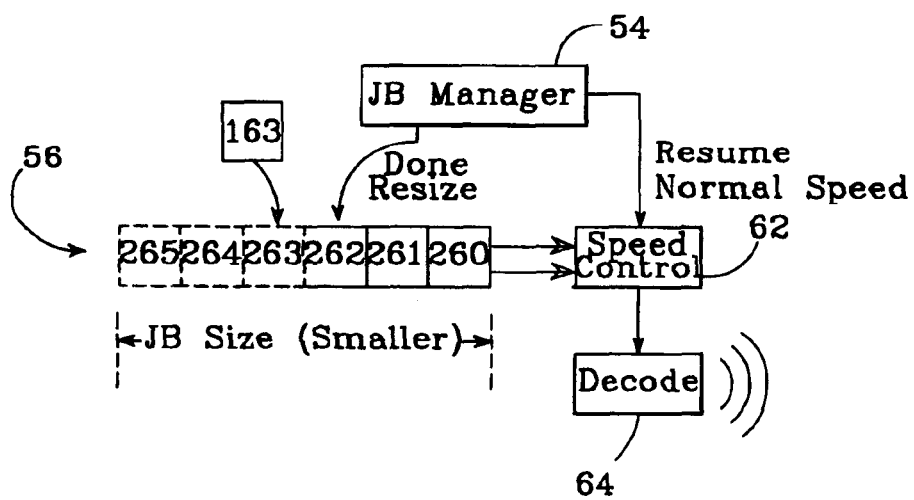
FIG. 6b is a diagram showing a time subsequent to FIG. 6a, when the jitter buffer manager has reestablished a steady state condition in equilibrium with changed network conditions.

In the contrary situation, illustrated in FIGS. 6a–6b, a network may suddenly improve in performance producing a case where a large jitter buffer 56 is being used (to deal with the formerly bad network condition) notwithstanding the fact that large buffer size and associated delays are no longer needed. In FIG. 6a, the Jitter Manager 54 detects the network's improvement through a large drop in the variance (APV) of arrived packets such as 158, shown. The Jitter Manager 54 determines that the jitter buffer 56 is too large compared to the variance in the arrived packets, so it begins a shrinking operation. The speed control 62 is directed to accelerate its packet consumption rate speeding up the speech output. As packets are consumed at faster than real-time from the jitter buffer 56, the Jitter Manager 54 reduces the jitter buffer's size and re-aligns the center. In FIG. 6b the operation is complete, the jitter buffer 56 is now much smaller, and it is introducing less delay to the speech being delivered to the user. Exemplary packet 163 arrives with substantially zero jitter and is loaded into center slot 263. Without the speed control 62, this shrinking operation would have required chunks of audio data to be discarded indiscriminately, with significant negative impact on the end-user quality. With speed control, the end user perceives only that the other party spoke (apparently) slightly more quickly for a moment or two (or paused less between his words), and that the slight delay noted earlier in the conversation was gone. Most users never notice that anything happened—they simply think that the overall quality of the conversation is quite good, better than that of prior voice-over-internet systems.

FIGS. 7a–7b show a final case of the jitter buffer manager 54 reacting to a network change. In some cases the average packet delay (APO) of the network may change without a significant change in jitter. This situation is shown in FIG. 7a. In the example shown, the average delay (APO) has increased so that packet 184, with average delay, is loaded into a slot far off center of the jitter buffer 56. Jitter Manager 54 detects the mis-alignment between the average packet offset and the center of the jitter buffer 56. If this mis-alignment becomes large enough (equal to or greater than a predetermined amount), the Jitter Manager re-aligns the jitter buffer by either slowing or speeding consumption rate of speed control 62. In this case it simply keeps the size of the jitter buffer 56 constant. The goal is to keep the jitter buffer centered under the packet arrivals so that packets do not have an increased likelihood of "falling off" one end or the other. In FIG. 7b, the system has again arrived at an equilibrium, in which the jitter buffer 56 receives packets at an average rate equal to its serial output rate at output 60 to speed control 62. Packet 292 is shown, with average delay, loading into the center of the shifted jitter buffer 56. The size of the buffer 56 is large enough to accommodate the variance of arrival offset, thus not missing any data packets (or missing only a predetermined fraction thereof, said fraction less than 1, so that a predetermined or user selectable audio quality is maintained).

If the jitter manager controls the jitter buffer to be large enough that essentially all of the packets are captured, the original MOS of the coder will be maintained for the far end listener (example: 99.9% packet capture would provide the full g.729a MOS of 3.9 to the end user). As packet capture is adjusted downward by using a smaller jitter buffer, the MOS score will drop (example: 98% packet capture would reduce the g.729a quality to approx 3.7 due to the 2% packet loss). Losses above 10% (less than 90% of packets landing within the jitter buffer) will have significant negative impact on sound quality resulting in MOS scores under 3.2. A good trade-off of sound quality vs. the added delay of a large jitter buffer will typically be found in the region of 98% to 99% packet capture (1% to 2% packets falling outside the jitter buffer), though this depends on the quality desires of the users and the magnitude of jitter in the network.

Speed Control Module

In accordance with the invention, a speed control module 62 responds to control signals from the jitter buffer manager 54. According to the control input, the module either augments the audio (extending it in time), contracts the audio (speeds it up) or passes it without modification (steady state operation).

Various speed control methods are known which mask variations in audio data consumption by psychoacoustically transparent or minimally intrusive filling (data augmenting) or decimation. To augment audio data, it is advantageous to selectively duplicate encoded packets corresponding to the silences between words, and/or stable vowel sounds. Other, similar techniques are also known in the art. To increase data consumption rate silences and vowel sounds are preferably shortened with minimally noticeable effect.

The speed control module can suitably be implemented in software executed by either a dedicated microprocessor, DSP chip, or the same microprocessor executing the jitter-buffer manager functions. Suitable software implementations are commercially available, for example from Cybernetics Infotech, Inc. in Rockville, Md. Another suitable technique is described by U.S. Pat. No. 5,189,702 to Sakurai et al. (1993). In most cases the speed control technique is applicable to the decoded audio, not the encoded packets, and thus should be applied after decoding; however, with suitable coding techniques speed control might be applicable to the encoded packets or performed as part of the decoder.

The use of speed control techniques is much preferred over unsophisticated data "filling" or decimation techniques. Such crude techniques introduce highly noticeable, annoying sounds, which detract from speech quality. The use of speed control in conjunction with the dynamically adaptive jitterbuffer is particularly advantageous in dealing with short term changes in network quality. We have found that the cooperation of the modules effectively masks quickly changing network conditions without noticeable degradation in audio quality.

Depending on the method of encoding used, it may be suitable to combine the speed control module 62 and the decoder 64 into a single, typically software implemented module. In many instances this combination results in savings of processing operations and therefore increases speed of operation.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A system for receiving digital voice signals transmitted over a data network, comprising:

a jitter buffer, having a variable storage size, arranged to receive packets of data comprising the digital voice signals, to store said packets, and to serially output said packets;

a jitter buffer manager which (a) monitors the arrival of said packets, (b) determines at least one variation parameter which measures the variation in transit delay among said arriving packets, and (c) controls the jitter buffer size in response to the variation parameter; and a speed control module, which responds to a control signal from said jitter buffer manager by modifying a rate of consumption of packets serially output from said jitter buffer, to compensate for changes in said jitter buffer's storage size comprising comparing an average packet delay with a reference delay corresponding to a temporally centered position in said buffer; and adjusting said variable rate of transfer of packets from said buffer when said average packet delay deviates from said centered position by more than a threshold amount, thereby moving said centered position to align with said average packet delay.

2. The system of claim 1, wherein the at least one variation parameter comprises a measure of variance between (a) actual packet arrival times, for a predetermined number of packets, and (b) a synchronous, average packet arrival time;

and wherein said jitter buffer manager controls said jitter buffer storage size in relation to said measure of variance.

3. The system of claim 2 wherein said buffer size is controlled to a size determined to allow capture of a predetermined fraction of packets within a predetermined time window, based upon the calculated measure of variance; and wherein said predetermined fraction is less than or substantially equal to 1.

4. The system of claim 2 wherein said speed control module responds to a control signal from said jitter buffer manager by reducing the rate of data consumption when said jitter buffer size is increasing, while augmenting the data to maintain a predetermined rate of audio output.

5. The system of claim 4, wherein said data is augmented by selectively duplicating data corresponding to silent periods.

6. The system of claim 2, wherein said speed control module responds to a control signal from said jitter buffer manager by increasing the rate of data consumption when said jitter buffer size is decreasing, while selectively discarding data to maintain a predetermined rate of audio output.

7. The system of claim 6, wherein said jitter buffer manager selectively discards data corresponding to silent periods.

8. The system of claim 2 wherein said speed control module adjusts the rate of data consumption from said jitter buffer while maintaining audio output which substantially corresponds to natural human speech characteristics.

9. The system of claim 1 further comprising:

an audio decoder, arranged to receive packets from said speed control module, to convert said packets into audio output.

10. A method of receiving digitally encoded, packetized audio transmitted across a data network, comprising the steps of:

monitoring the arrival times of audio packets as they are received from the network;

loading said packets into a buffer having an adjustable size;

calculating an average packet delay relative to a synchronous serial output from said buffer, calculating a time-varying variance parameter which quantifies deviations in packet delay from said average packet delay;

adjusting said size of said buffer in response to a calculated value of said time-varying variance parameter, transferring said packets serially from said buffer at a variable rate to compensate for changes in size of said buffer, comparing an average packet delay with a reference delay which corresponds to a temporally centered position in said buffer, and adjusting said variable rate of transfer of packets from said buffer when said average packet delay deviates from said centered position by more than a threshold amount, thereby moving said centered position to align with said average packet delay.

11. The method of claim 10, comprising the further step of selectively modifying a decoded speech signal with a speed control module, to mask changes in said variable rate of transfer of said packets.

12. The method of claim 10, wherein said variance parameter is calculated as a sum of absolute values of deviations from a moving average of packet delay.

13. The method of claim 10, wherein said variance parameter is compared to a growth threshold, and said step of adjusting the size of said buffer comprises increasing said size when said variance parameter exceeds said growth threshold.

14. The method of claim 10, wherein said variance parameter is compared to a shrink threshold, and said step of adjusting the size of said buffer comprises decreasing said size when said variance parameter is less than said shrink threshold.

15. The method of claim 10, wherein said buffer size is adjusted to a size which will be statistically likely to accept a predetermined fraction of packets, based upon said calculated variance parameter, where said predetermined fraction is selected to produce a predetermined subjective audio quality in an audio signal decoded from said packets.

* * * * *